Aug. 18, 1953     M. T. ULRICH     2,649,259
SPINNING AND FLY REEL
Filed June 15, 1949
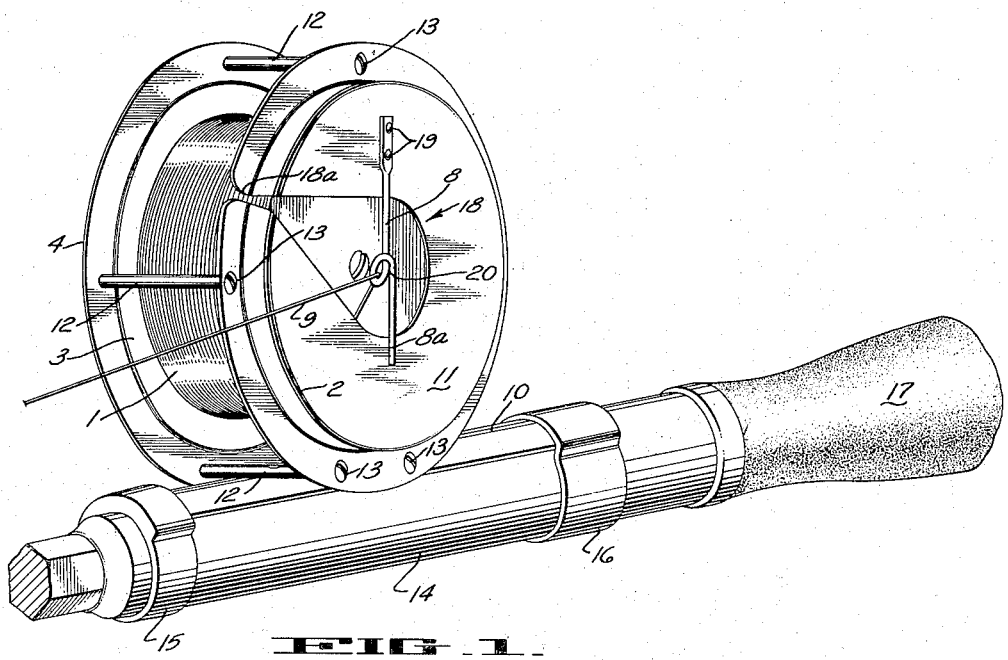
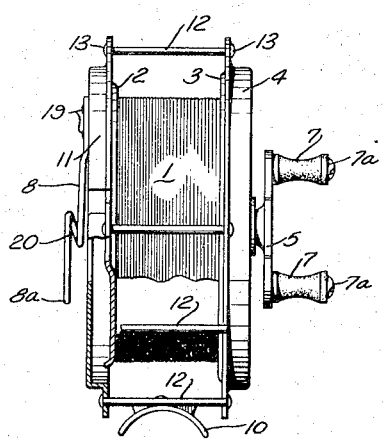
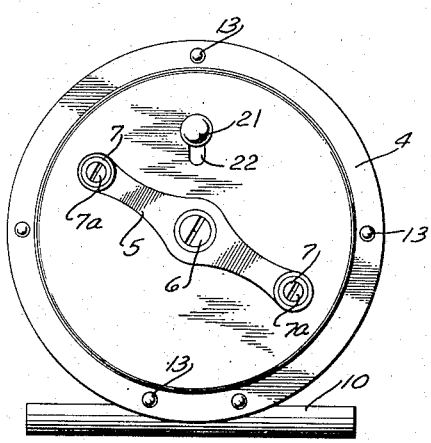
INVENTOR.
MARTIN T. ULRICH Patented Aug. 18, 1953

2,649,259

UNITED STATES PATENT OFFICE 2,649,259

SPINNING AND FLY REEL

Martin T. Ulrich, Centerville, Calif.

Application June 15, 1949, Serial No. 99,161

1 Claim. (Cl. 242—84.6)

This invention relates to fishing apparatus and more particularly to the equipment employed by fishermen to get the bait, fly or other lure outwardly from the shore or boat to the spot in the pool or stream where the fish are likely to be at the time. This operation is ordinarily known by the term casting, and generally includes the use of a flexible fishing rod and a geared, multiple drive, level wind reel employed therewith. In casting with this outfit the fisherman makes a sweep of the fishing rod tip with the lure depending therefrom through a wide arc about the handle of the rod, simultaneously releasing the spool of the reel so that the spool is free to rotate and allow the line to be paid out as fast as the momentum of the sinker and lure, etc. on the end of the line will take it. At the instant of the lure striking the water, the angler immediately stops the rotation of the spool usually with thumb or finger, or with a brake device with which some reels are equipped. Unless the spool is stopped in time, the latter's continued rotation in the direction of paying out the line when there is no outward pull on the line to take it off the spool will inevitably result in the highly undesirable backlash of the reel and resulting tangling of the line therein.

The difficulties of casting with the level wind reel just described are greatly amplified in the practice of the art of fly fishing or trout fishing with the equipment usually provided for this purpose, inasmuch as the spools of flycasting reels are usually not geared but are driven at the same speed as the handle crank and turn very easily, with the result that the additional line that must be paid off the reel during the latter part of the cast accelerates the rotation of the spool greatly unless cautiously braked by the caster.

The search for an effective anti-backlash device for fishing reels has occupied the attention of workers in the field for many years and various expedients have been proposed in the form of adjustable braking means to apply a drag upon the line when the same is required. The chief difficulty of all such arrangements is the problem of replacing mechanically the art that must be practiced by the flycaster himself in this elusive and highly difficult technique. Thus, most contrivances are an aid to the skilled fly caster but do not supply a substitute for a certain knack on the part of the latter.

In recent years, however, there has been a notable advance in the design of casting reels with the introduction of the so-called spinning reel in which the line is slipped off the periphery of a spool whose axis is disposed parallel with the fishing rod so that no rotation of the spool which is the cause of back-lash is necessary. The chief difficulty with such spinning reels has been in providing satisfactory provision for rewinding the line upon the spool due to the axial disposition of the latter in parallelism with the rod.

By the invention hereinafter more fully described it is proposed to utilize the dependable line recovery action of the conventional fly reel and to lead the line loops across and beyond one disk of the reel spool in true spinning action and thence to guide the line into the usual guides of the rod.

It is therefore an object of this invention to provide a spinning reel of new and improved type and characterized by extreme simplicity and versatility.

It is a further object of the invention to provide a fishing reel of the fly casting type which may be operated in both casting and rewinding as a conventional fly reel or may be utilized as a spinning reel in casting and a conventional fly reel in rewinding.

A further object of the invention is to provide an improved fishing reel of the type described in which the change from spin casting arrangement of the line to either casting or recovering of the line in conventional fly reel manner is manually controllable by the fisherman.

Another object of the invention is to so guide the line laterally of the axis of the spool in a fly casting reel of conventional type that the line may be uncoiled therefrom in fully effective spin casting manner and guided to the fishing rod without material obstruction or friction therein.

Another object of the invention is to produce correct spinning action with all the advantages thereof through inexpensive modification of a conventional fly reel.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring now to the drawing:

Figure 1 is a view in perspective of the im- 2,649,259 proved reel of this invention mounted upon a conventional fly rod.

Figure 2 is a side elevation of the reel of this invention taken from the right side of Figure 1.

Figure 3 is a front elevation of the reel of Figure 2 taken from the left side of Figure 2.

Referring to the drawing there is shown a fly reel embodying the present invention and comprising a spool 1 having a central hub concealed by the turns of line wound thereover and a pair of spaced disks 2 and 3. The disks are preferably of plane conformation for their major diameters and then outwardly terminate convexly as shown in Figure 3. The radial curvature of disk 3 which is preferably of slightly greater diameter than the disk 2 closely approaches the dished portion of a vertical wall 4 to minimize the danger of the line passing beyond the disk, while the smaller disk 2 is curved to facilitate the passage thereover of the loops of the line as will later be described. Such curved portion is also made very smooth and polished and may be plated to provide a surface that will remain as frictionless as possible over a long period of use.

The hub of spool 1 is mounted centrally of the vertical wall 4 upon a shaft projecting axially thereof to the opposite disk 2 and any suitable retaining means may be employed to retain the spool 1 on such shaft while permitting free rotation thereof. The aforesaid reel components are of simple character and since they comprise, except for the disk 2 of reduced diameter, conventional fly reel constructions, they have not been shown in detail. Further, any suitable crank as that shown at 5 may be secured to the shaft referred to to rotate the same, the screw 6 serving to retain the crank on said shaft as will be apparent. Also, the rollers 7 mounted to rotate with respect to the crank by means of respective shafts mounted in the latter constitute conventional construction in the art of fly reels. Retaining screws 7a may be employed to retain the rollers 7 on their shafts.

Before completing the references to further details of conventional reels it is desired to call attention to the line guide 8 shown in Figure 1 which serves to thread the line off of the disk 2 peripherally and thence to the first rod guide (not shown). It will be noted that despite the particular mounting for the guide 8 shown herein, it is essentially a ring or loop having portions which are spaced from each other in the direction of the spool axis to enable the line 9 to be passed therethrough into threaded position. Accordingly, the guide 8 may be supported from the horizontally disposed base 10 or even from the rod itself by means of a separate mounting thereon if desired. These alternatives are, of course, considerably inferior as to convenience of manufacture and operation to that shown and later to be described in complete detail but are mentioned here to emphasize the pioneer nature of applicant's contribution inherent in the guide 8 in making highly feasible and entirely satisfactory the rapid and successive loop transfer over the periphery of the disk 2 as a true spinning action.

The preferred embodiment of the invention, however, utilizes a shell including a vertically extending wall 11 generally similar to that of the wall 4 and connected in spaced relation thereto by bored and threaded rods 12 spaced about the periphery thereof and maintained in place by screws 13 as is well known in the construction of fly reels. The structure referred to as the shell includes also a horizontally disposed wall 10 which is convexly curved in its longitudinal direction to snugly engage the curved section of the rod 14 and which may be secured to a pair of more closely spaced rods 12 at the lower portion of the reel assembly in any suitable manner as is well known. A fixed ferrule 15 at the end of the rod handle 17 serves, together with a movable ferrule 16 thereon to clamp the reel to the rod handle portion thereof as will be apparent.

It is preferred to cut out centrally the vertical wall 11 for a substantial radius to provide a circular opening of considerable but less size than that of the disk 2 and to extend the edge portions defining this opening tangentially toward the outer margin but in the form of a gradually narrowing slot, as is clearly shown in Figure 1 at 18. Slot 18 is directed forwardly, has a slightly upward inclination and serves to facilitate the passage of the line from the guide 8 to its conventional winding position upon the spool 1 as will be later described.

It will be noted from Figure 1 that the guide 8 is preferably formed from a rod having one end portion flattened and secured to the vertical wall 11 as by riveting at 19 while the other portion extends downward to form a loop which is concentric with the axis of the disk 2. Also the crossed portions of the loop at 20 are spaced apart to provide a clearance for manually passing the line into the eye of the loop and withdrawing the same therefrom as will be specifically described. It is desired also to continue the spacing not only of the outer crossed portion of the guide 8 from the portion 20 but to carry it completely to the end of the portion 8a of the guide so that such portion 8a is in spaced relation to the wall 11 to more easily thread the guide 8.

It will be understood that variations in the showing of the conventional fly reel features may be made without altering the principle of the invention or its application. Thus the usual click control is indicated at 21 and is operable by downward movement in the slot 22. Also the crank 5 may be offset with respect to the spool shaft and multiple gearing disposed therebetween to increase the relative rotation of the spool and crank in rewinding if desired. Other modifications will readily occur to one skilled in the art.

In the utilization of my combined spinning and fly reel the spool is first wound with suitable line substantially to fill said spool and the line passed laterally through the slot 18, downwardly between the crossed portion of the guide at 20, beneath the lower end 8a of the guide and upwardly and outwardly to complete the threading. This operation can be readily performed without disturbing the threading of the line through the guides of the rod. With the click 21 in "on" position, the cast is then made in the same manner as with a level wind reel, viz. in a single sweep of the rod tip through the air and in the direction of the cast. The thumb may be applied against the line remaining on the spool to stop the outspinning of the successive loops therefrom to drop the lure at the precise spot desired.

To rewind the line it is merely necessary to reverse the movements already described for threading the guide 8. The tension on the line outwardly from the reel quickly pulls the line through the slot 18 and into position on the spool ready for rewinding. If the fish strikes the lure at the instant of stopping the cast, it is a simple and instantaneous operation to flip the line into rewinding position and continue to play the catch as in usual fashion.

The device of the invention is no heavier than conventional fly reels and no more expensive, unlike spinning reels with which I am familiar. Also no special training or instruction is needed since only the guide threading technique is new and that is easily mastered. Accordingly, the adaptability of use to the spinning and conventional rewinding, or if desired, the use as a standard fly reel commends the invention to all those who are interested in making more tangible to the novice the benefits of fly fishing.

I claim:

A combined spinning and fly reel providing conventional fly reel action to the fishing line in recovery and similar action or spinning action in casting as desired, comprising a spool including a pair of spaced disks and an intermediate hub for carrying a fishing line, a shell having a pair of spaced, vertically extending walls, at least one of said walls being of a larger diameter than one of said disks and being disposed substantially immediately adjacent thereto and axially aligned therewith, and also a horizontally disposed wall joining the lower portions of said vertical walls and adapted to be removably mounted upon a fishing rod, said one of said walls being provided with a radial slot extending from a point opposite the axis of said hub through the margin of said wall, said slot being of decreasing width from said point opposite the hub axis to said wall margin, and a line guide supported by said latter wall adjacent said slot and spaced from the disk of said spool opposite from said wall for guiding the successive loops of said fishing line off said spool and forwardly along the said rod in casting and to permit said line to return to normal tangential relation for rewinding upon said spool, said line guide including a substantially vertical portion secured at one end thereof to said one wall and spaced from the latter at the other end thereof, and an open looped portion intermediate the ends thereof through which said line may be selectively passed through and disengaged from.

MARTIN T. ULRICH.

References Cited in the file of this patent

UNITED STATES PATENTS

| Number | Name | Date |
|---|---|---|
| 1,114,084 | Wells | Oct. 20, 1914 |
| 2,034,917 | Miller | Mar. 24, 1936 |

FOREIGN PATENTS

| Number | Country | Date |
|---|---|---|
| 22,271 | Great Britain | of 1909 |